Sheet 1 C F Jauriet

Impd Fire-Box of Steam Generators.

Assigned to C F Jauriet and A I Ambler.

Reissue No. 2824

2824

C F Jaurlet.

Impd Fire-Box of Steam Generators

Assigned to C F Jaurlet & A I Ambler

4 Sheets-Sheet 2

Re. 2824

Witnesses
Chas. Clemson
Ed. H. Sprague

Inventor
C F Jaurlet
by Dewey & Co
his attys

C F Jauriet.
4 Sheets
Sheet 3
R.S. 2824
Impt Fire Box of Steam Generators,
Assigned to C.F. Jauriet and A I Ambler.
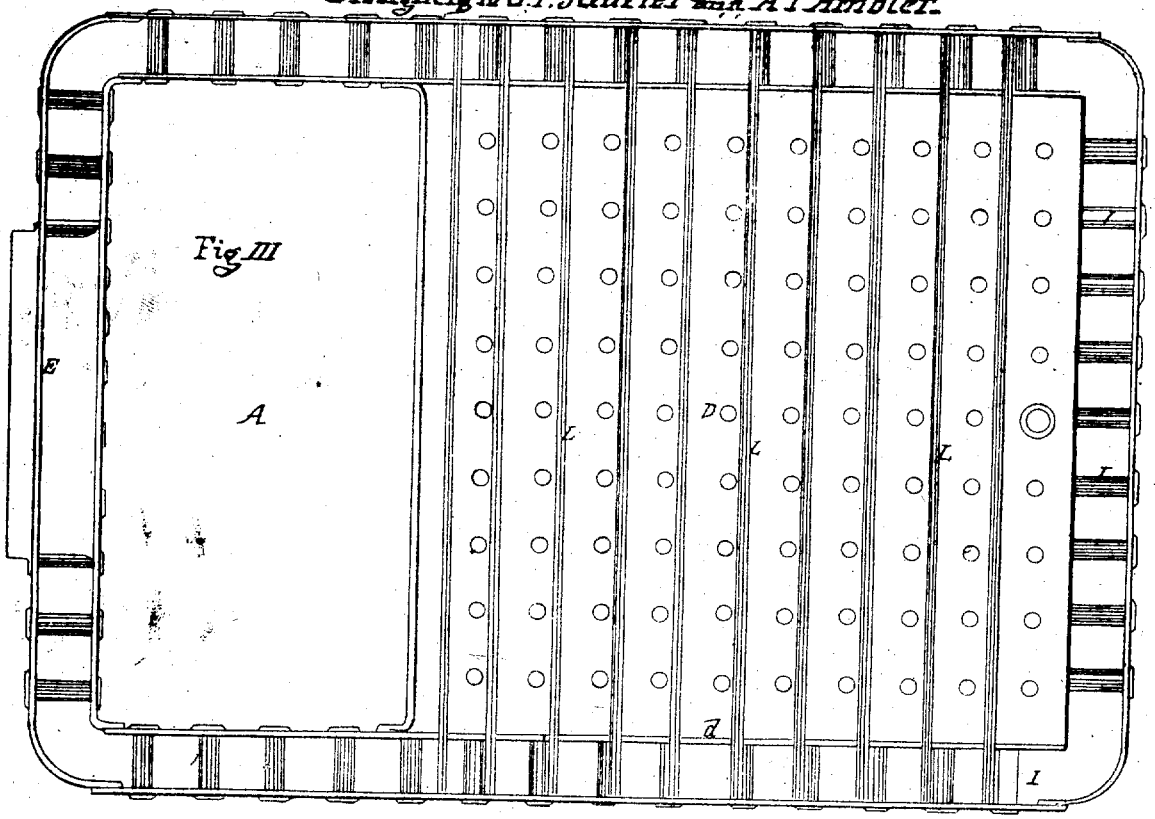
Fig V
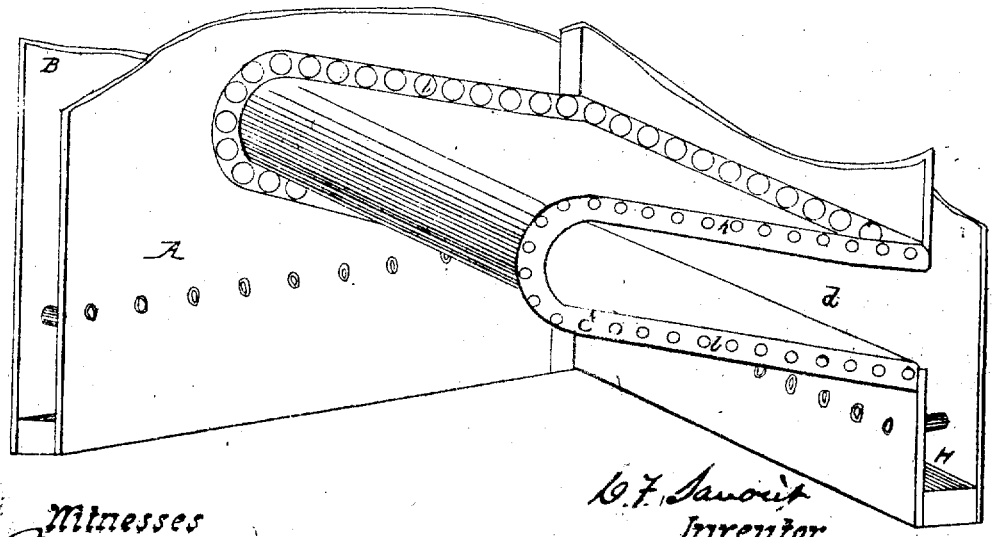
Witnesses
[illegible] Sprague
[illegible]
C.F. Jauriet
Inventor
by
D.B. Mallery & Co
his attys 4 sheets - sheet 4
R. J. 2824
C F Jauriet.
Patented Dec. 31. 1867
Imp^t Fire Box of Steam Generators
Assigned to C F Jauriet & A I Ambler
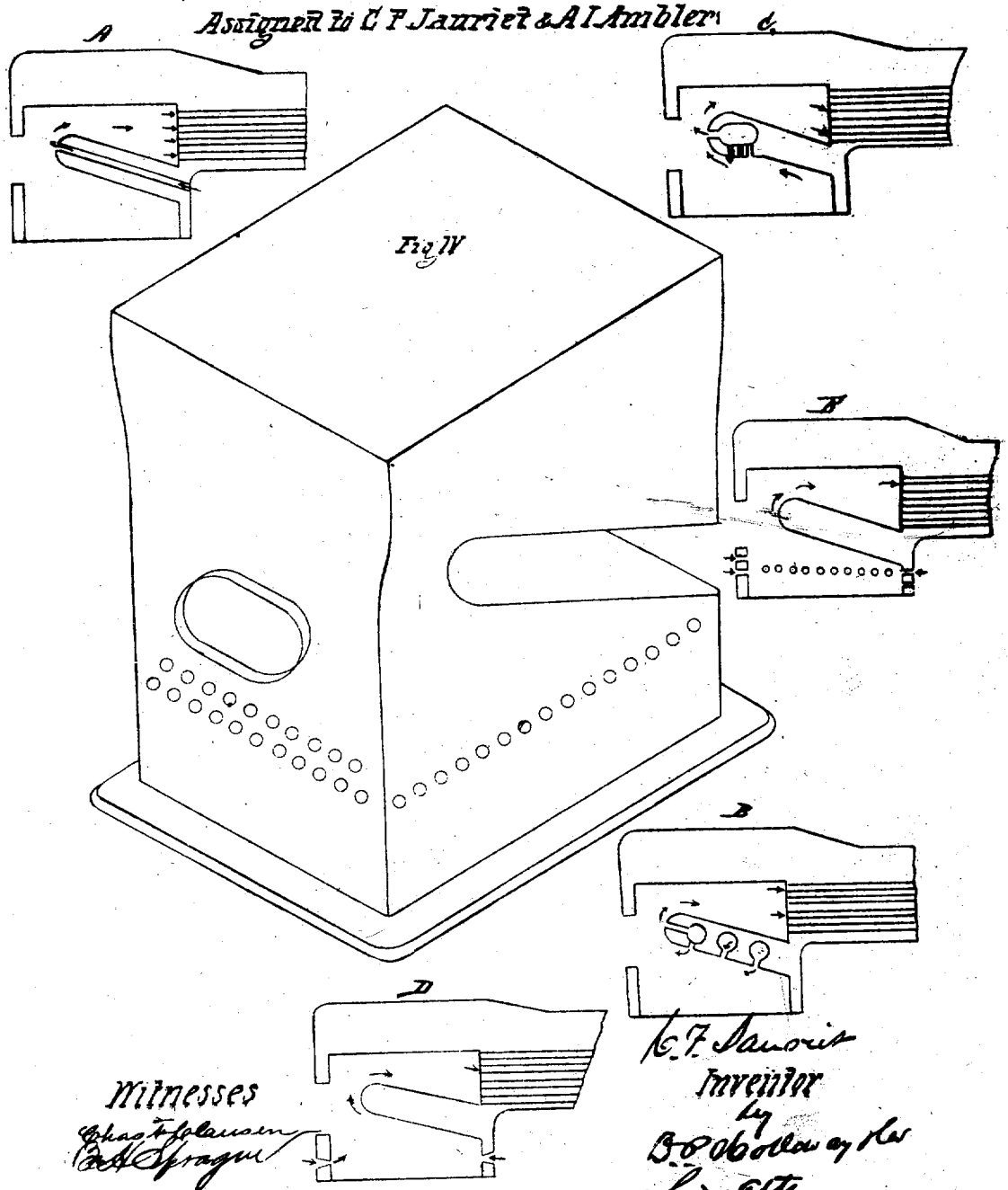
Witnesses
Chas. F. Clausen
Geo. Sprague
C. F. Jauriet
Inventor
by
B. C. Dodge atty for
his atty -

United States Patent Office.

CHARLES F. JAURIET, OF AURORA, ILLINOIS, ASSIGNOR TO HIMSELF AND A. I. AMBLER.

*Letters Patent No.* 52,945, *dated February* 27, 1866; *reissue No.* 2,824, *dated December* 31, 1867.

DIVISION A.

IMPROVEMENT IN STEAM-GENERATORS.

The Schedule referred to in these Letters Patent and making part of the same.

TO WHOM IT MAY CONCERN:

Be it known that I, C. F. JAURIET, of Aurora, in the county of Kane, and State of Illinois, have invented a new and useful Improvement in the Construction of Fire-Boxes of Steam-Generators for coal-burning engines, containing therein a water-bridge or deflector for the more perfect consumption of the fuel; and I do hereby declare that the following is a full and exact description of the same, reference being had to the accompanying drawings, forming a part of this specification, in which—

Figure 3 is a section of the fire-box, with water-bridge in line *y y* of fig. 1.

Figure 4 is a perspective view of the fire-box, with water-bridge and holes for hollow bolts or air-jets, as it appears detached, or when not enclosed by the outer jacket of the fire-box.

Figure 5 is a sectional perspective view of the fire-box, with water-bridge and air-jets, as it appears when enclosed with the outer jacket, shown broken away and in section.

Diagrams in red ink, A B C D E, represent and illustrate the line of experiments by which I arrived at the result desired for the admission of air to the fire-box in the right quantity and place to secure the rapid ignition of the fuel and the most perfect consumption of the gases.

The sole object I have in presenting these diagrams, and describing the same, is to show the line of experiments followed to obtain the admission of air to the fire-box in the right quantity and place, and as a part of the history of the invention, and not as anything new or foreign to the original application, or the patent granted thereon. These diagrams, however, will be more fully described and set forth in the other branch, or second division of this application for reissue.

Similar letters of reference in the several figures indicate corresponding parts.

The nature of my invention consists in an improved construction of fire-boxes of steam-generators, with water-bridge or deflector, whereby every part of the bridge is protected by the circulating water, and an equable distribution of heat is maintained over the whole surface of the bridge, and also whereby an uninterrupted circulating of the water through the chamber of the bridge, at the back end and both sides of the bridge, is secured, and thus the even temperature of the bridge, at all points, maintained, and much of the liability to explosion from imperfect, defective, or obstructed circulation overcome; and whereby, also, all the known advantages resulting from the use of a partition or water-bridge in the fire-box are obtained, without the disadvantages attending other devices for this purpose, and in the most economical manner.

To enable others skilled in the art to make and construct and use my invention, I will proceed to describe its construction and mode of operation.

My water-bridge is limited in its application to a location in that part of the fire-box in which the first ignition or burning of the fuel takes place; and in its arrangement, its rear terminus is below the flues of the boiler, while its front end is about as high as the top of the feed-door of the fire-box, but some distance in rear of said door, as represented. This location is not peculiar to my box, as the same has been used in connection with distinctive features of other inventions.

Figure 1:
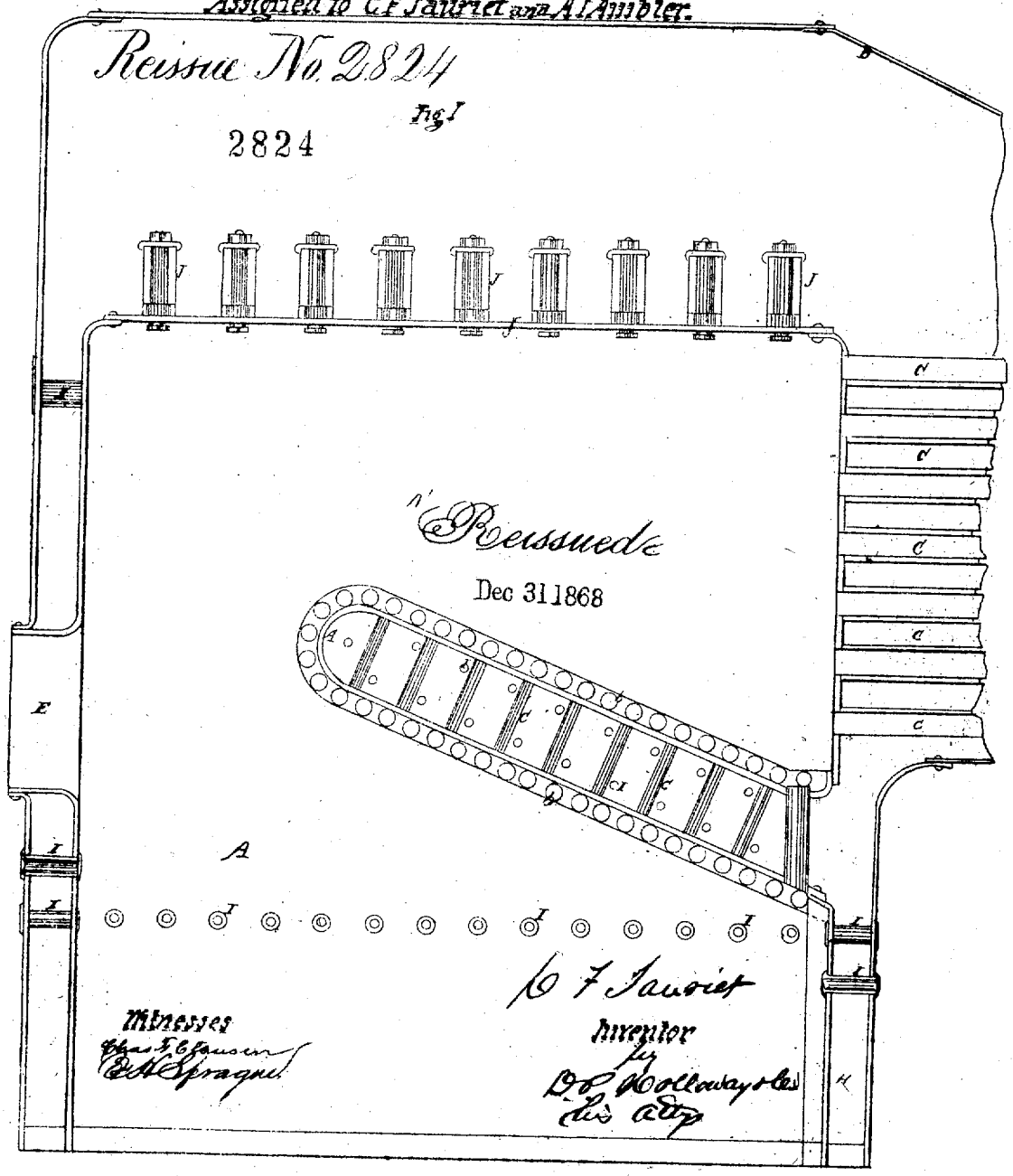
Figure 1 is a vertical longitudinal section of the fire-box, and a portion of the flue-end of a coal-burning engine, showing combustion-chamber, water-bridge, and air-jets.
Figure 2:
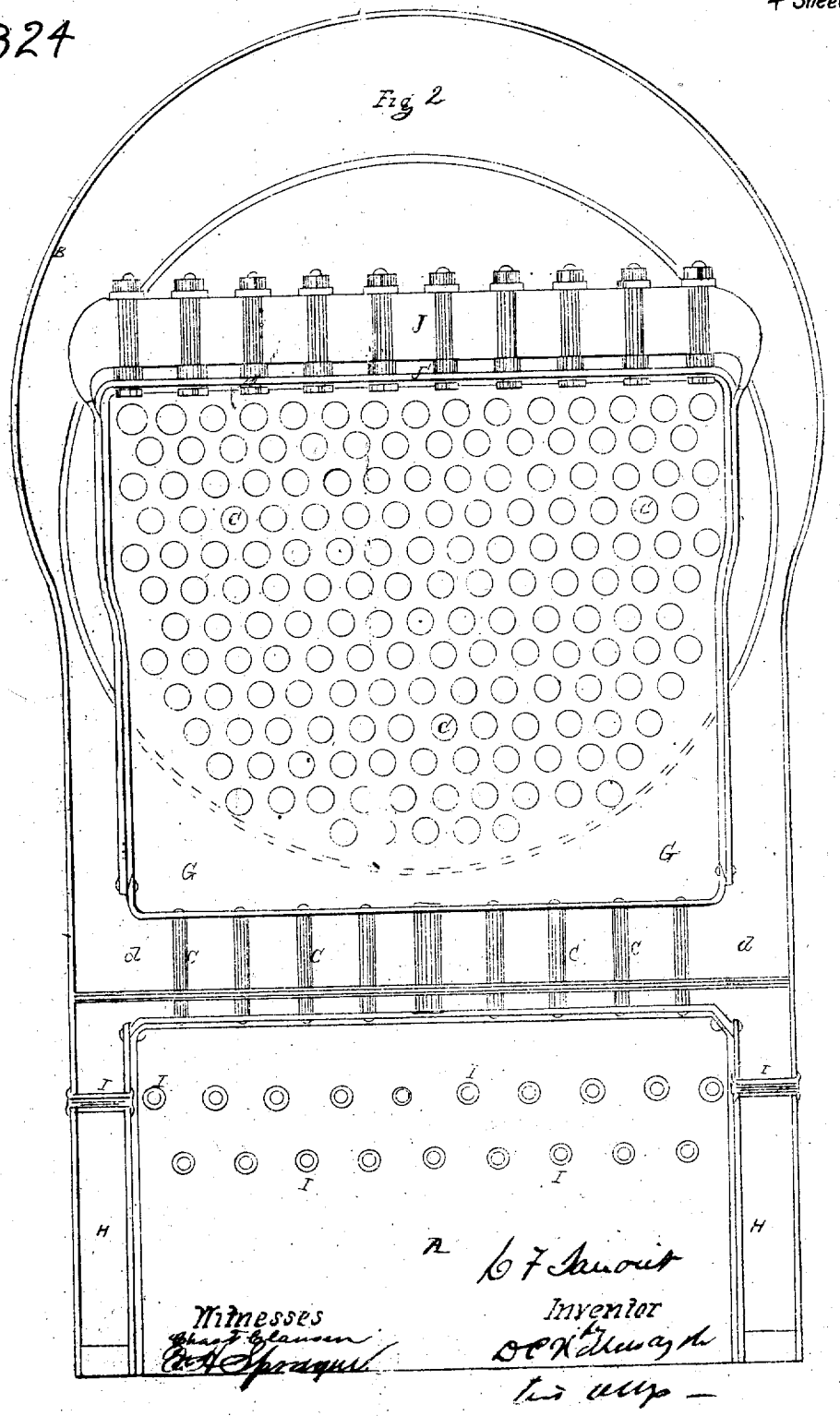
Figure 2 is a vertical transverse section of the same, in line *x x* of fig. 1.

In the drawings, A represents the fire-box in furnace; A′, the combustion-chamber; B, the boiler or jacket of the fire-box, and of the flues or tubes C C. D is the water-bridge; E, the feed door; F, the "peep-hole" through which the engineer inspects the internal condition of the fire-box. H H designate what are usually termed "water-legs" of the fire-box. I I are a series of tubular bolts passing through the inner and outer walls of the fire-box, and used for the purpose of supplying air to the fire-box, to assist in the ignition of the fuel and the consumption of the gases. J J are the ordinary crown-bars, which, by means of stay-bolts, as shown, support the crown-sheet of the fire-box. J′ is the crown-sheet. I make my water-bridge, D, by taking a flat sheet of copper, or other suitable metal, and bending it into the form of a semi-tube, the sheet of metal being of sufficient size at top and bottom, both in width and length, to suit the size of the box to which it is to be applied, the upper and lower sides of said semi-tube being flattened, so as to be on straight lines, or nearly so, from the points where they leave the curve or rounded part *d* of the sheet which is bent. The form that I have attempted to describe is clearly shown in figs. 1, 4, and 5 of the drawings. This semi-tube or sheet of metal thus bent has its ends and side edges turned out at right angles, so as to form bolting or riveting flanges *b b*, as shown. I thus have a bridge which is fully open at one end and at both of its sides, said opening continuing to the closed or bent end of the bridge, and entirely across the sheet, as represented. It will also be observed that this water-bridge forms a water-connection across the fire-box, at a certain angle, for deflecting the fire, but without curve or arch. To stay this bridge vertically, I introduce through the upper and lower portions or parts of the sheet screw or threaded stay-bolts *c c*, said bolts being tapped in the sheet in which the bridge is formed. To apply this bridge to the interior of the fire-box A, I cut out of each of the side and back walls of the inner lining of the fire-box a piece of metal, corresponding exactly in form and size with a vertical longitudinal section of the bridge, as represented at fig. 4, that is to say, corresponding with the end and side openings of the bridge as formed and constructed for application. This being done, the bridge is set in its place, which is in line with passages *d' d'*, figs. 2 and 4, and securely riveted by its flanges or flanches *b b* to the inner sides and back walls of the fire-box, both above and below, as fully and clearly represented and shown in the drawings. I tie the outer jacket or walls together, and thus strengthen the box, when the inner lining is cut away at the sides, and the bridge applied, as shown, I put in through stay-bolts I' I', from one side to the other, as represented, the full opening and mode of construction and application of my water-bridge, admitting of this being done without passing the stay-bolts through the fire-box exposed to fire, or where the flame circulates, the stay-bolts being protected from the fire by passing through the water-bridge when the water circulates freely. The tubular stay-bolts I I are tapped in and riveted inside and outside of the fire-box, passing through the water-leg, as shown. They also serve as stay-bolts at the place indicated for their application. The riveting of these bolts forms a beading, without obstructing the free passage of the air into the fire-box, as shown.

From an inspection of the drawings, with the foregoing description, it will be seen that I have obtained an unobstructed circulation of the water, and a free communication between the chamber of the flues and the water-bridge, and also between the back and side water-legs of the fire-box and boiler, which communications are all equal in size with the back and side openings of the bridge, and thus have a free and unobstructed circulation of water into, through, and out of the bridge.

I am aware that this inner lining has been perforated with holes for the purpose of admitting water to a partition in a fire-box, but my experiments have demonstrated to me the necessity of a free and unobstructed circulation, which my plan seems alone to afford. To perforate the lining and leave it otherwise intact, causes a sediment to accumulate at the seams, and divisions made by the greater portion of the metal being left, and the result causes the boxes so constructed to soon leak and burn out, and thereby greatly endangering the safety of the box. I have thoroughly tested the result of divisions, compartments, and seams in this connection, and have always found them to be both objectionable and dangerous, and I abandoned them for the more bold and decided course of removing the metal entirely, and by this means secured a free and unobstructed circulation of the water into, through, and out of my water-bridge.

I may here also remark that this circulation could not be successfully and practically attained by a curved or arched partition in a fire-box; if the perforation of the holes in the inner lining, above referred to, were in combination with a curved partition in a fire-box, which would be destructive of the principle of free circulation, as the level of the water-line would be destroyed by the curved partition, and the tendency would be to superheat the steam, and thus endanger the safety of the boiler, which would be increased by the obstruction of the perforated lining. I apprehend that a free circulation can only be obtained by the plan I have adopted, and herein, with the aid of the drawings, endeavored to describe. I also dispense entirely with all boxes and partitions up through the water-bridge, or in any way connected therewith. In a word, every part of my water-bridge is of uniform thickness and uniformly exposed to the fire, and protected by the circulating water, and consequently an equable heating thereof is secured, and an unequal expansion and contraction prevented.

The leading object I have in view is to render perfectly practical and safe the use of the water-bridge deflector in the fire-box of a coal-burning engine, and at the same time render the mode of manufacture or construction of the fire-box with such a bridge as little objectionable as possible to those who are to use it.

The great importance of a deflector or reverberator in the fire-box of a coal-burning engine is pretty generally understood and admitted at the present time; but it may not be improper to make the following statement in connection with this specification:

When the fire-box is made without a water-bridge or deflector to arrest the flame temporarily in its passage towards the flues, as well as molify the influence of the draught, the exhaust-steam creates a draught so very powerful that it will tear up the bed of fuel or coal, and draw or force the smaller particles, in which combustion has not fully taken place, into and through the flues, depositing them at the front end of the boiler, or discharge them from the smoke-stack, in the form of black smoke, and at the same time entering the flues diagonally, cutting the beading, and greatly injuring the joints of the flues with the flue-sheet, so as to produce leakage, and drawing or forcing the heat, flame, and smoke directly to the flues, diagonally across the box, thereby producing very little effect upon the crown-sheet, whose heating-surface and capacity for generating steam are correspondingly lost.

Plain boxes require also to be run with a much heavier bed of coal, to molify the influence of the draught caused by the exhaust-steam, and the consumption and waste of fuel are correspondingly greater. By the use of the water-bridge a lighter bed of coal is used, and the fuel is more economically consumed; in fact, by the employment of a water-bridge, deflector, or reverberator, are all of these difficulties obviated and done away with, if such bridge, deflector, or reverberator be so constructed and applied as to afford or allow a free and unobstructed circulation of the water in and through it, a smooth and easy passage of the flame under and over it, and so as to be equally acted upon by the heat at all points, and thus secure equal expansion and contraction during the various changes in temperature to which it is subject while being used, and when the fires are slackened or allowed to go out altogether.

With a properly-constructed water-bridge a large extra heating-surface is secured, and at the same time such a bridge serves as a deflector or reverberator, deflecting the fire and heat forward and upward, thereby throwing it upon and against the crown-sheet, whose entire heating-surface and steam-generating capacity are thereby made available. Thus, the bridge itself affords heating-surface, and by it other parts of the fire-box are made available therefor; and it also effectually prevents the coal from being drawn violently against the flue-sheet and through the flues, as hereinbefore mentioned, and at the same time retains the gas in the fire-box and combustion-chamber long enough to be thoroughly consumed before entering the flues, attention being paid to the manner of firing or supplying the fuel, which should be done often and in small quantities, scattered and thoroughly distributed over the surface of the fire, in such manner as to obtain the most rapid ignition.

My invention is equally applicable to stationary engines, steamship-engines, and all engines in which coal is used as fuel. It should be stated, however, that in case of stationary engines and steamship-engines, steam-tugs, &c., a fan-blower and suitable tubes or conducts for the air should be constructed and connected with the air-jets I I, so as to introduce the proper quantity of air to the fire-box for the purpose named, and this can be readily done by any person skilled in the art.

Having thus described my invention, I disclaim a partition or division in a fire-box, as such, as the same, in varied forms and plans of application, has long been known and used; but

What I do claim as my invention, and desire to secure by Letters Patent, is—

1. A water-bridge placed within the fire-box, constructed in the form of a semi-tube, as set forth, flanged and riveted to the flue-sheet and side water-legs, so as to afford an unobstructed communication with the back-water space and side water-legs, said sheet being sustained by stay-bolts, substantially as set forth.

2. The combination of the vertical stay-bolts C C and the through stay-bolts I′ I′ with the semi-tube water-bridge and the outer jacket of the fire-box, substantially as shown and for the purpose set forth.

C. F. JAURIET.

Witnesses:

RICHD. I. MOORE,

W. F. WHITEHOUSE.